United States Patent Office 2,861,111
Patented Nov. 18, 1958

2,861,111

PROCESS FOR THE ALLYLATION OF BENZENE AND HOMOLOGOUS HYDROCARBONS

Igor Scriabine, Lyon, and André Peyrolade, Le Peage-de-Roussillon, France, assignors to Societe des Usines Chimiques Rhone-Poulenc, Paris, France, a corporation of France No Drawing. Application March 19, 1956
Serial No. 572,203

Claims priority, application France April 7, 1955

4 Claims. (Cl. 260—671)

The present invention concerns a new process for the allylation of benzene and homologous hydrocarbons.

The alkylation of aromatic hydrocarbons may be effected by using, as alkylating agent, a saturated aliphatic alcohol, an alkyl halide or a mineral alkyl ester such as an alkyl sulphate or alkyl borate. The reaction is effected in the presence of known catalysts which are specified for each of these alkylating agents. However, the aforesaid methods, which give good results in alkylation, are not systematically applicable where it is desired to attach not an alkyl radical but an allyl radical to the aromatic hydrocarbon.

Thus, for example, it is possible to effect alkylation of benzene by reacting benzene with a saturated aliphatic alcohol in the presence of sulphuric acid as catalyst, though the same reaction is not catalysed by aluminium chloride. On the other hand, if instead of a saturated aliphatic alcohol, allyl alcohol is employed, allylation takes place in the presence of aluminium chloride but not in the presence of sulphuric acid.

Moreover, if benzene is treated with an alkyl chloride or allyl chloride in the presence of a Friedel and Crafts catalyst, alkylbenzenes are obtained in the first case, but in the second case only a mixture of chloropropyl-benzene and propenylbenzene is obtained.

Furthermore, the method of allylation of benzene by the action of allyl alcohol in the presence of aluminium chloride is not universally applicable to the benzene homologues and the only known method, for example, of preparing the allyl derivative of cumene is by condensing allyl chloride with p-cumyl-magnesium bromide (Beets and Van Essen: Recueil des Travaux chimiques des Pays-Bas, 70, 1951, page 25). The use of a magnesium derivative on an industrial scale, however, presents many difficulties.

According to the present invention a process for the production of allyl derivatives of benzene and of hydrocarbons homologous therewith, comprises heating benzene or a homologous hydrocarbon with allyl borate in the presence of a Friedel and Crafts catalyst. The term "homologous hydrocarbons" is to be understood to include the alkylated hydrocarbons such as toluene, xylene, ethylbenzene, propyl benzene and higher alkyl benzenes, cumene and cymene.

The process is preferably carried out by adding the allyl borate in small portions to a stirred mixture of the hydrocarbon and the catalyst. The mixture is thereafter maintained for one or two hours at a moderate temperature, e. g., 50–100° C. The products of the reaction and the unconverted reactants are then separated by known methods, e. g. by decanting the hydrocarbon layer, washing it with water, drying it and subjecting it to fractional distillation.

Preferably the reaction is effected in the presence of a quantity of the order of $1/25$ to $1/50$ mol. of catalyst per mol. of hydrocarbon to be converted. Friedel and Crafts catalysts include aluminium chloride, boron fluoride and ferric chloride. Of these ferric chloride is of outstanding value in the present invention in affording relatively higher yields of the required products.

The allyl borate employed is the product corresponding to formula $B(O-CH_2-CH=CH_2)_3$, and it is in the form of a liquid boiling at 95° C. under 36 mm. of mercury. It is preferably employed in quantities of the order of $1/10$ mol. per mol. of the hydrocarbon to be allylated. The products of the process of the present invention are for the most part known per se and their utility as intermediates in various processes is known from the literature.

The following examples, in which the parts are understood to be by weight, will serve to illustrate the invention. They describe the preparation of allylbenzene and of p-allylcumene, the latter substance being an interesting product in organic synthesis, more especially as an intermediate product for the preparation of aromatic derivatives employed in the perfume industry.

Example I

Into a stirred mixture of 2,340 parts of anhydrous benzene and 162 parts of pulverised anhydrous ferric chloride are introduced, in 40 minutes and while the temperature is maintained between 25° and 35° C., 303 parts of allyl borate. The mixture is then heated for one hour at 70° C. The mass is cooled and filtered and the hydrocarbon layer is washed with 2,000 parts of water. It is decanted and thereafter dried over sodium sulphate. On distillation, 209 parts of allyl benzene are obtained, boiling point 155–156° C./740 mm. Hg, refractive index $(n_D^{20})$ 1.5105.

Example II

Into a stirred mixture of 3,600 parts of dry cumene and 162 parts of pulverised ferric chloride are introduced, in 35 minutes and while the temperature is maintained at 25–35° C., 303 parts of allyl borate. The mixture is then heated for one hour at 70° C. The mass is cooled and filtered and the hydrocarbon layer is washed with 2,000 parts of water. It is decanted and thereafter dried over anhydrous sodium sulphate or magnesium sulphate. On distillation, 325 parts of p-allylcumene are obtained, boiling point 82–83° C./10 mm. Hg, refractive index $(n_D^{20})$ 1.5070.

We claim:

1. A process for the production of p-allylcumene which comprises heating cumene with allyl borate in the presence of ferric chloride.

2. A process for the production of p-allylcumene which comprises heating to 50–100° C. cumene with allyl borate in the presence of ferric chloride.

3. A process for the production of p-allylcumene which comprises heating to 50–100° C. cumene with allyl borate in the presence of ferric chloride, the said allyl borate being present in a proportion of the order of 1/10 mol per mol of cumene present.

4. A process for the production of p-allylcumene which comprises heating to 50–100° C. cumene with allyl borate in the presence of ferric chloride, decanting the cumene layer from the reaction mixture washing it with water, drying it, and subjecting it to fractional distillation.

References Cited in the file of this patent

FOREIGN PATENTS 367,292    Great Britain _____ Feb. 18, 1932

OTHER REFERENCES

Houston: Jour. Am. Chem. Soc., vol. 48, 1926, pp. 1955–1959.

Shell Chemical Corp. "Allyl Alcohol," 1946, pp. 36–37, Technical Publication SC: 46–32, pub. by Shell Chemical Corp., 100 Bush St., San Francisco.

Kuivila et al.: Jour. Am. Chem. Soc., vol. 73, 1951, pp. 123–124.

Faraday: Encyclopedia of Hydrocarbon Compounds, volume $C_9H_{8-14}$, 1954, pp. 09018.00.11–09018.00.13 (allyl-benzene).